US008411132B2

(12) United States Patent
Kubicka et al.

(10) Patent No.: US 8,411,132 B2
(45) Date of Patent: Apr. 2, 2013

(54) SYSTEM AND METHOD FOR REAL-TIME MEDIA DATA REVIEW

(75) Inventors: Alan Kubicka, Boca Grande, FL (US); Mike Gullickson, Manhattan Beach, CA (US); Azuolas Sinkevicius, Chicago, IL (US); Bruce Breckenfeld, Lake Geneva, WI (US)

(73) Assignee: Audio Properties, Inc., Chicago, IL (US)

( * ) Notice: Subject to any disclaimer, the term of this patent is extended or adjusted under 35 U.S.C. 154(b) by 254 days.

(21) Appl. No.: 13/015,345

(22) Filed: Jan. 27, 2011

(65) Prior Publication Data

US 2012/0194635 A1    Aug. 2, 2012

(51) Int. Cl.
*H04N 7/14* (2006.01)
(52) U.S. Cl. .......... 348/14.12; 348/14.11; 348/14.03; 386/248; 386/285
(58) Field of Classification Search .... 348/14.01–14.16; 386/248, 285
See application file for complete search history.

(56) References Cited

U.S. PATENT DOCUMENTS

| | | | |
|---|---|---|---|
| 6,598,074 B1 | 7/2003 | Moller et al. | |
| 7,634,533 B2 | 12/2009 | Rudolph et al. | |
| 2002/0019845 A1 | 2/2002 | Hariton | |
| 2003/0225832 A1 | 12/2003 | Ludwig | |
| 2004/0003045 A1 | 1/2004 | Tucker et al. | |
| 2005/0010874 A1 | 1/2005 | Moder et al. | |
| 2005/0097613 A1* | 5/2005 | Ulate et al. | 725/86 |
| 2005/0285935 A1 | 12/2005 | Hodges et al. | |
| 2006/0002546 A1 | 1/2006 | Stokes, III et al. | |
| 2006/0053380 A1 | 3/2006 | Spataro et al. | |
| 2006/0132595 A1 | 6/2006 | Kenoyer et al. | |
| 2006/0147029 A1 | 7/2006 | Stokes, III et al. | |
| 2006/0239443 A1 | 10/2006 | Oxford et al. | |
| 2007/0009114 A1 | 1/2007 | Kenoyer et al. | |
| 2007/0189508 A1 | 8/2007 | Knutson et al. | |
| 2008/0013758 A1 | 1/2008 | Tsai et al. | |
| 2009/0067349 A1 | 3/2009 | Glueckman et al. | |
| 2009/0106429 A1 | 4/2009 | Siegal et al. | |
| 2009/0119737 A1 | 5/2009 | Perlman et al. | |
| 2009/0148124 A1* | 6/2009 | Athsani et al. | 386/46 |

FOREIGN PATENT DOCUMENTS

GB    2 428 529 A    1/2007

OTHER PUBLICATIONS

SpeechWare, TBMK02USB, Microphones.com, http://www.microphones.com/microphone.cfm?URLID=TBMK02USB, Sep. 13, 2010.
Push to Talk USB MIC, http://www.Google.com/products?q=push+to+talk+usb+mic&rls=com.microsoft:*&oe=U . . . , Sep. 13, 2010.

(Continued)

*Primary Examiner* — Melur Ramakrishnaiah
(74) *Attorney, Agent, or Firm* — Foley & Lardner LLP

(57) ABSTRACT

A system is provided for receiving communication data that uses a first amount of bandwidth at a communication computing device. Portions of the communication data are displayed on a display and are provided to at least one speaker. A playback computing device receives playback data via a communication interface. The playback data uses a second amount of bandwidth that is greater than the first amount of bandwidth. A display of the playback computing device displays high-quality video data of the playback data, and a plurality of speakers output high-resolution audio data of the playback data. A talkback device is coupled to both the communication computing device and the playback computing device. The talkback device includes a microphone to provide at least a portion of the communication data and an activating element that, upon activation, mutes the plurality of speakers.

20 Claims, 3 Drawing Sheets

OTHER PUBLICATIONS

"Cisco TelePresence Recording Studio," Cisco Systems, Inc. http://cisco.com/en/US/solutions/ns669/telepresence_recording_studio_solutions.html, Sep. 25, 2010.

"Cisco TelePresence Recording Server," Data Sheet Cisco Systems, Inc., 2010, pp. 1-3.

"The New Digital Musician Container Is Released," Digital Musician, http://digitalmusician.net/en/infocenter/news/new-digital-musician-container-released, Sep. 25, 2010.

"Life-Like Telepresence/That is Affordable and Easy to Use," Espresso HD by XVD, http://espressohd.com, Sep. 25, 2010.

"What is Mac OS X—iChat," Mac OS X, Apple, http://www.apple.com/macosx/what-is-macosx/ichat.html, Sep. 25, 2010.

"Recommended Video Conferencing Equipment: WebCams, HD Cameras, Headsets and Tabletop Microphones," Nefsis, http://www.nefsis.com/Best-Video-Conferencing-Software/video-conferencing-equipment . . . , Sep. 25, 2010.

"Polycom Recording and Streaming," Polycom, Inc. htp://www.Polycom.com/products/telepresence_video/recording_streaming/index.html.

"Home Buying Guides, Solo USB Conference Microphone," http://shopwiki.com/Solo+USB+Conference+Microphone, Sep. 25, 2010.

\* cited by examiner

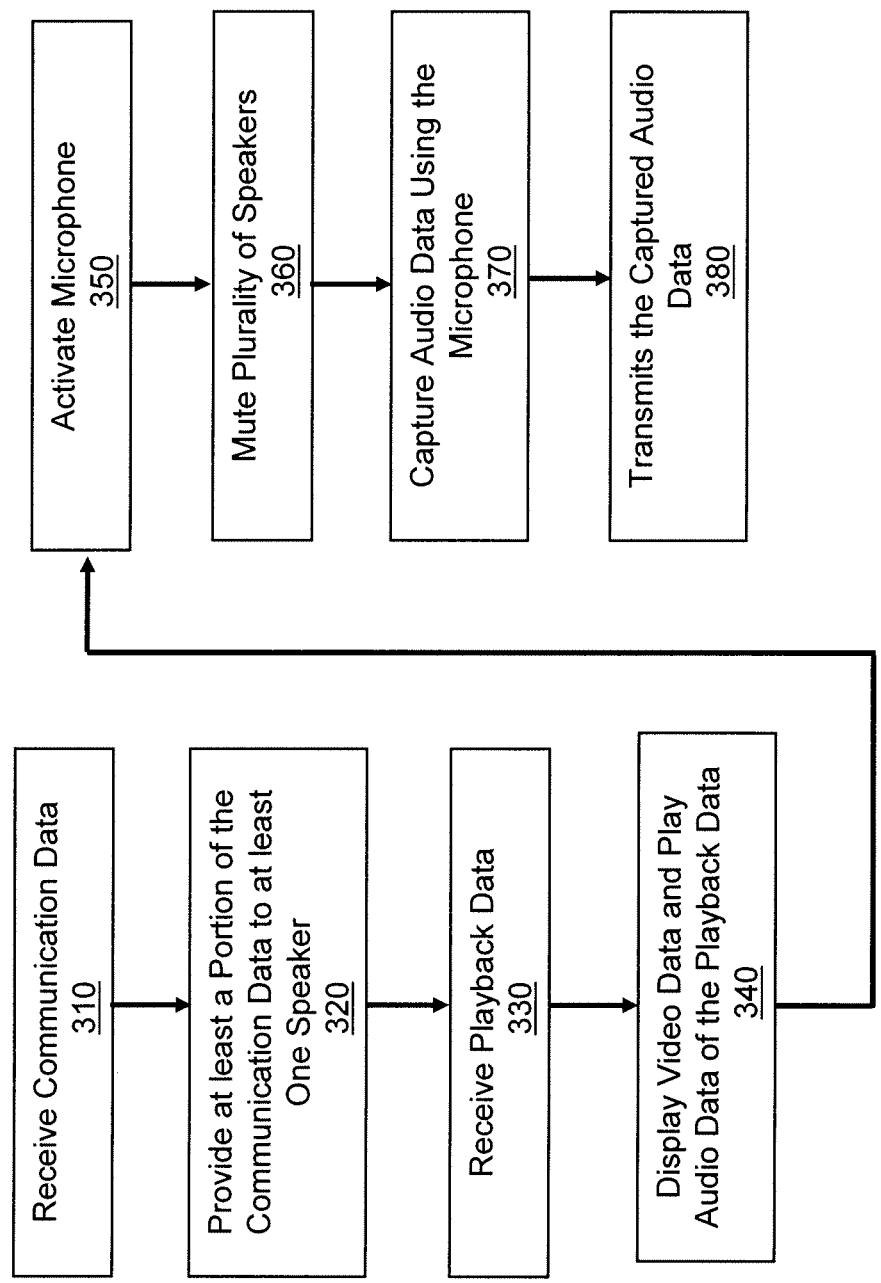

SYSTEM AND METHOD FOR REAL-TIME MEDIA DATA REVIEW

BACKGROUND

The following description is provided to assist the understanding of the reader. None of the information provided or references cited is admitted to be prior art.

A typical recording studio includes a studio and a control room. The studio provides an area where performers play instruments and voice artists sing, narrate, or speak. The control room is where the sound from the studio is recorded. The control room also allows playback and manipulation of the recorded sound. Producers and audio engineers may manipulate, process, balance, or mix sound recordings in numerous ways to create a final version. For instance, separate sound recordings can be layered on top of one another. In addition, properties of the sound recordings, such as the volume, balance, and pitch can also be manipulated.

Although producers and audio engineers mix the final version, before the final version is distributed, other individuals determine if the final version is acceptable or if changes are required. Clients, artists, and executives are examples of possible other individuals that may provide input as to how a final version should be changed. Possible changes can include a small change, such as slightly adjusting a single property of a single sound recording, all the way through re-recording each sound recording. Regardless of the scope of the change, the final version must be again manipulated or re-mixed. In addition, the audio may be combined with video, which increases the complexity of the approval process as the properties of the video and the combination of audio and video will be changed numerous times during this step. Once an updated final version is completed, approval of a high-quality master version is likely again required from other individuals. Once the final master version is approved by the appropriate parties, the master media file can be distributed accordingly.

SUMMARY

Applicants have recognized that because the numerous individuals involved in approving a media file are likely not present in the recording studio with the producers and the audio engineers, the process of getting approval can be lengthy. In view of this lengthy process, Applicants have recognized and appreciated a need for efficient communication between diverse parties, coupled with the highest-quality media for review, to shorten the approval process. Accordingly, various inventive systems and methods disclosed herein relate generally to facilitating communication between remote parties, and allow playback of the high-quality audio and video media in the studio as well as remotely.

An illustrative system includes a communication computing device, a playback computing device, and a talkback device that is operatively coupled to both the playback and communication playback devices. The communication computing device includes a chat module that is configured to transceive communication data to and from a studio computing device. The communication data includes video data and audio data and uses a first amount of bandwidth. The communication computing device also includes a communication display configured to display the video data of the communication data and at least one communication speaker configured to convert to sound the audio data of the communication data. The playback computing device includes a playback interface configured to receive playback data, wherein the playback data comprises video data and audio data, and wherein the playback data uses a second amount of bandwidth that is greater than the first amount of bandwidth. The playback computing device also includes a playback display configured to display the video data of the playback data and a plurality of playback speakers configured to convert to sound the audio data. The talkback device includes a microphone configured to provide at least a portion of the communication data to the communication computing device and an activating element configured, upon activation, to unmute the microphone and mute the plurality of playback speakers of the playback computing device.

An illustrative process includes receiving first communication data from a remote device at a communication computing device, wherein the communication data uses a first amount of bandwidth. The process further includes providing at least a portion of the first communication data to at least one speaker of a first computing device. The process further includes receiving playback data at a playback device, wherein the playback data comprises audio data and video data, and wherein the playback data uses a second amount of bandwidth that is greater than the first amount of bandwidth. The process further includes displaying the video data of the playback data on a display of the playback computing device, and providing the audio data of the playback data to a plurality of speakers of the playback computing device. The process further includes activating a microphone and muting the plurality of speakers in response to the activation of the microphone. The process further includes capturing audio data using the microphone and transmitting the captured audio data to the remote device from the first computing device.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 is a flow diagram depicting operations performed in reviewing playback data in accordance with an illustrative embodiment.

DETAILED DESCRIPTION

Figure 1:
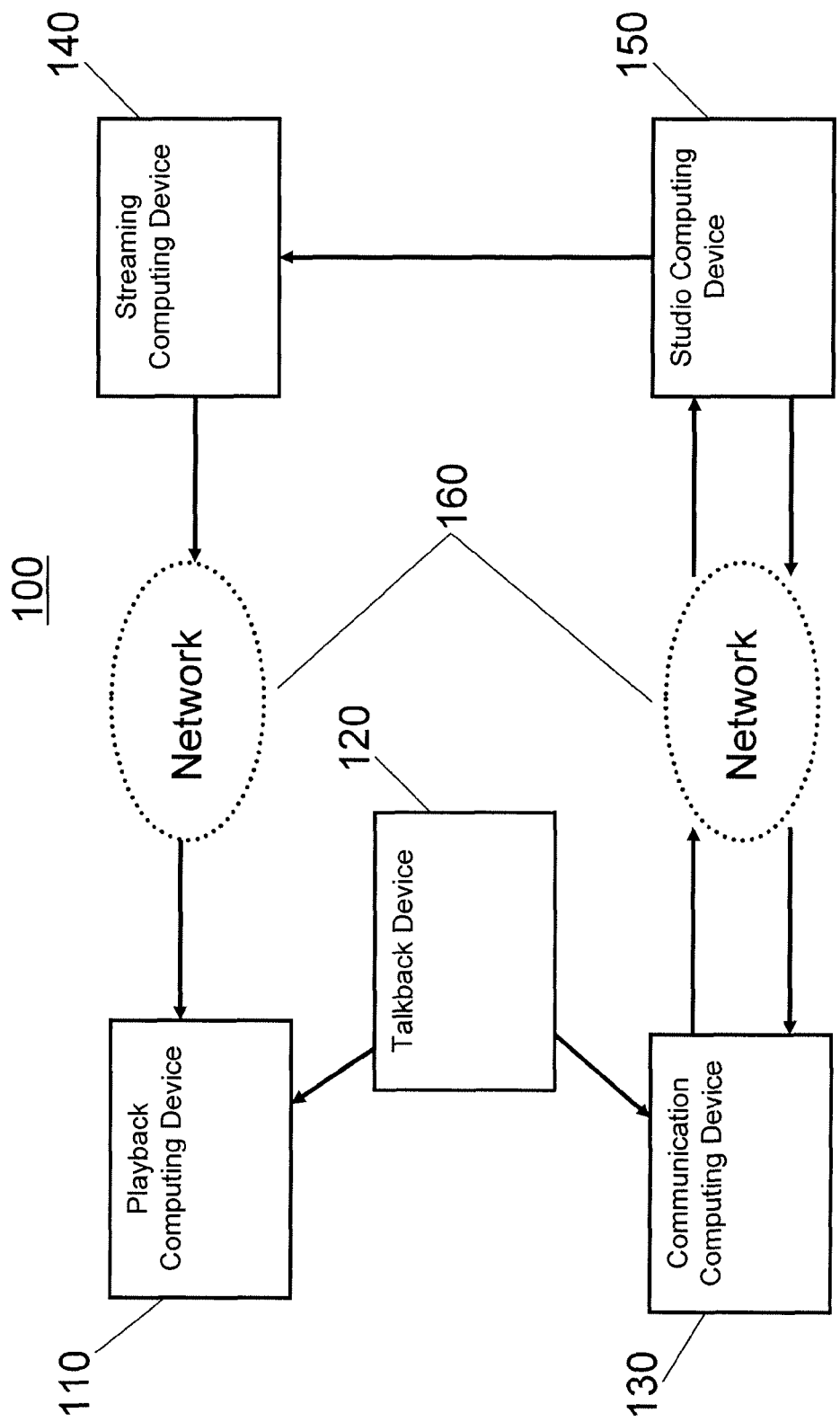
FIG. 1 is a block diagram of a media data review system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are illustrative systems and methods for playing a media file at a remote site and for real-time communication between the remote site and a recording studio setting. The system includes a communication computing device that sends communication data and receives communication data from a remote studio computing device. Non-limiting examples of communication data include voice, audio, and textual data. The communication computing device includes a first display to display a portion of the communication data and at least one speaker to present a portion of the communication data. The system also includes a playback computing device that receives playback data. The playback data can include audio data or audio and video data. Non-limiting examples of playback data include a television advertisement, a radio commercial, sound effects, voiceover narration, musical score, etc. The audio data is output on a plurality of speakers and the video data is output on a second display. In an illustrative embodiment, the speakers provide support for 5.1 surround audio and the second display provides support for high definition video. In one embodiment, the bandwidth used by the playback data is greater than the bandwidth used by the communication data. For example, the playback data can include high definition video and surround sound audio, and the communication data can include standard video and stereo or mono audio. In this non-limiting example, the bandwidth of the high definition video and surround sound is greater than the bandwidth of the standard video and stereo or mono audio.

In one embodiment, the system also includes a talkback device 120 that is connected to both the communication computing device and the playback computing device. The talkback device includes a microphone. The default state of the microphone is muted, such that the microphone is not capturing audio data. An activating element is used to activate or unmute the microphone. Along with activating the microphone, in one embodiment the activating element mutes the plurality of speakers of the playback computing device. When active, the microphone provides a portion of the communication data to the communication computing device. When the microphone is in its default state, the plurality of speakers of the playback device are unmuted.

The system, therefore, allows real-time communication between a person at the remote site and another person at the recording studio setting. The real-time communication is an efficient way to provide feedback to the recording studio. Based upon the communication, an updated master version of media can be created, transmitted to the playback computing device, and displayed to the user reviewing the changes. This user can provide immediate feedback as to any further changes. This process can continue until a final version is agreed upon.

Additional details and embodiments are described with reference to the figures. FIG. 1 illustrates a media data review system 100 in accordance with an illustrative embodiment. A communication computing device 130 is connected to a network 160, such as the internet, a local area network, or a wide area network. A studio computing device 150, located at a separate and distinct location from the communication computing device 130, is also connected to the network 160. In one embodiment, the studio computing device 150 is located in a recording studio and the communication computing device 130 is located at a remote client location. The communication computing device 130 includes a chat module that sends and receives communication data to and from the studio computing device 150. Communication data can include one or more of voice, audio, or textual data. The studio computing device 150 includes a corresponding chat module. The chat modules allow real-time communication between the remote locations. In one illustrative embodiment, the chat modules include text, audio, or video chat programs that are well known in the art. For example, the chat module can include using the Skype, iChat, or any other instant messaging software that is capable of real-time data exchange. The communication computing device includes a first display to display at least a portion of the communication data and at least one speaker to present at least a portion of the communication data. For example, the first display can present a video portion of the communication data, and the at least one speaker may output an audio portion of the communication data.

The system 100 also includes a playback computing device 110, which is located at the same location as the communication computing device 130. The playback computing device 110 is also connected to the network 160 via a playback interface. Various ways of connecting to networks are well known to those of skill in the art. Non-limiting examples of playback interfaces include wired and wireless network interfaces. The playback computing device 110 receives playback data from a streaming computing device 140. The playback data can include audio data or audio and video data. The streaming computing device 140 prioritizes the audio data over the video data, to ensure the highest quality audio is received at the playback computing device 110. In one embodiment, the audio data is prioritized over the video data utilizing quality of service data. For example, the audio data can be sent to the playback computing device 110 in packets marked as a higher priority service and the video data packets can be marked as a lower priority service. Another example of prioritizing audio includes reducing the resolution and/or frame rate of the video data. Playback data including the reduced video data would require less bandwidth than the original video data.

The playback computing device 110 includes a second display for displaying the video data, and a plurality of speakers for outputting the audio. The audio and video data of the playback data is typically encoded in a higher resolution or contains more data per second than the communication data. Accordingly, the playback data uses more bandwidth than the communication data.

Playback data is multimedia data that can include, but is not limited to, audio only or audio and video. In one embodiment, the playback data includes high-definition video and surround-sound audio. The surround sound audio can be in any of the formats known to those of skill in the art. For example, the surround-sound audio can be in, but is not limited to, uncompressed high bit-rate, high sample-rate audio, Dolby Digital, or DTS. Examples of high-definition video received by the playback computing device 110 include, but are not limited to, any Qucktime codec, Windows Media or, Flash. The playback data is reviewed on the playback computing device 110.

A talkback device 120 is coupled to both the playback computing device 110 and the communication computing device 130. The talkback device 120 includes a microphone. In a default state, the microphone is not active. Thus, the microphone is not actively capturing audio data. The talkback device 120 includes an activating element configured to activate the microphone. Examples of activating elements include, but are not limited to, a push-button, a switch, or a touchscreen button. When active, the microphone captures audio data, and transmits the audio data to the communication computing device 130. In one embodiment, the talkback device 120 is coupled to the communication computing device 130 using a Universal Serial Bus (USB) connection. Hardware converts the analog audio signals from the microphone into digital audio data. The digital audio data is sent over a USB cable to the communication computing device 130. The communication computing device 130 uses the audio data as communication data, and sends the audio data to the studio computing device 150. Accordingly, the talkback device 120 can be used to communicate with the remote studio location.

When the microphone is active, audio near the talkback device is sent through the communication computing device 130 to the studio computing device 150. The studio computing device 150 also includes a microphone that captures audio near the studio computing device 150. The audio near the studio computing device 150 can include the audio data sent from the communication computing device 130. Feedback will occur if the studio computing device 150 captures the audio sent from the communication computing device 130 and sends the audio back to the communication computing device 130. The communication computing device 130 could then capture the audio again using the talkback device 120 and transmit the audio data to the studio computing device 150. This process would rapidly repeat, causing unwanted feedback to be heard at both the communication computing device 130 and the studio computing device 150. To avoid this unwanted and disruptive feedback, when the microphone of the talkback device 120 is active, the talkback device 120 mutes the plurality of speakers of the playback computing device 110. In an illustrative embodiment, the talkback device 120 is connected to the playback computing device 110 using an external analog connection after an output of surround sound or stereo audio (i.e, a receiver) but before the plurality of speakers. The talkback device 120 can also be connected to the playback computing device 110 using any type of connection known to those of skill in the art. In another embodiment, the at least one speaker of the communication computing device 130 is also muted when the microphone of the talkback device 120 is active.

The system 100, therefore, allows a user at one location to communicate over the network 160 with an audio engineer and/or a producer at a remote recording studio location. The audio engineer and/or producer, using the studio computing device 150, can manipulate, modify, and/or remix a media file. The studio computing device 150 can instruct the streaming computing device 140 to transmit the media file, e.g., the playback data, to the playback computing device 110. The streaming computing device 140 connects to the network 160 using a communication interface. Various communication interfaces to connect to networks are well known to those of skill in the art. As the playback data is being presented at the remote location on the playback computing device 110, the microphone of the talkback device 120 is not capturing audio. When the user desires to talk with the audio engineer and/or producer, the activating element is activated. Upon activation, the plurality of speakers of the playback computing device 110 are muted and the microphone of the talkback device 120 begins to capture audio. The captured audio is transmitted to the communication computing device 130, which sends the audio data across the network 160 to the studio computing device 150.

In another embodiment, the communication computing device 130 further includes a camera. The camera captures video and sends the video as communication data over the network 160 to the studio computing device 150. The camera is not affected by the activation of the talkback device 120, and continually sends video to the studio computing device 150.

The system 100 can optionally include other features. For example, the streaming computing device 140 can include a security feature. The security feature provides a number of rules regarding what computing devices are allowed to receive the playback data. For example, a rule can specify that only a particular Internet protocol (IP) address or a particular domain name can receive the playback data. Another rule can restrict sending playback data only to certain dates and times, such as only allowing playback data to be sent on weekdays from 8 am until 5 pm. The various security rules can be combined to form more complex rules that control how the playback is sent to a playback computing device 110, such as, but not limited to, allowing playback data to be transmitted to a particular IP address only at certain times.

The streaming computing device 140 is not limited to sending playback data to a single playback computing device. In one embodiment, playback data can be simultaneously streamed to multiple playback computing devices, thus allowing users at multiple locations to review a media file. Because various playback computing devices may have different capabilities and different available bandwidths, the resolution of the playback data can be individually configured for each playback computing device. A non-limiting example includes high resolution playback data sent to a first computing device and lower resolution playback data sent to a second computing device. The streaming computing device 140 or the studio computing device 150 can be used to configure the resolution of the playback data. In one embodiment, each playback computing device sends data relating to its capabilities, such as capable video resolution, supported video formats, supported audio formats, and available bandwidth, to the streaming computing device 140. The resolution and format of the playback data can be configured based upon this received capability data.

In one embodiment, the playback computing device 110 includes a display and a plurality of speakers for review of the playback data. However, the playback computing device 110 does not have control over the playback data. For instance, the playback computing device 110 is unable to pause, stop, rewind, or fast forward the playback data. The streaming computing device 140, however, does have the ability to control the playback data. The playback data can be controlled by the audio engineer and/or producer through direct input of data through the streaming computing device 140 or by communication with the streaming computing device 140 through the studio computing device 150.

As the playback computing device 110 is responsible for reviewing playback data, it does not send audio or video data to the streaming computing device 140 or to the studio computing device 150. The playback computing device 110, however, can send some other types of data to the streaming computing device. Logging data is one non-limiting example of data that can be sent from the playback computing device 110 to the streaming computing device 140. Logging data can include, but is not limited to, an indication that review of playback data has begun, an indication that all of the playback data has been reviewed, or an indication that the plurality of speakers have been muted due to the activation of the talkback device 120. Such logging information is sent from the playback computing device 110 over the network 160 to the streaming computing device 140 or to some other computing device (not shown). The received logging information can be stored for later retrieval and use. For example, the logging information can be used to indicate that a certain media file was completely reviewed without audio interruption from the talkback device 120.

In another embodiment, the streaming computing device 140 and the studio computing device 150 are combined into a single computing device. In yet another embodiment, the streaming computing device 140 and the studio computing device 150 are located in different locations, which are both separate from the location of the playback computing device 110 and the communication computing device 140.

Figure 2:
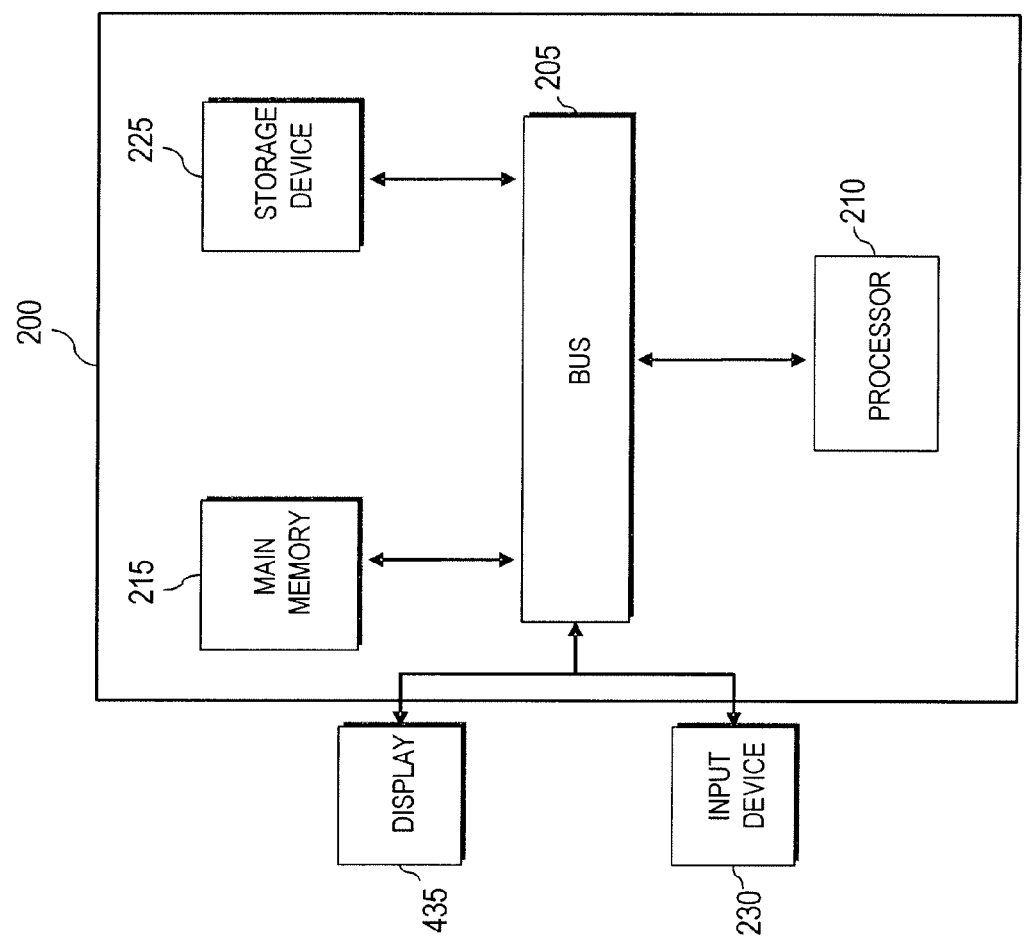
FIG. 2 depicts an illustrative computing device which can be used in the playback system in accordance with an illustrative embodiment.

FIG. 2 depicts an illustrative computing device 200 which can include the playback computing device 110 or the communication computing device 130. The computing device 200 includes a bus 205 or other communication mechanism for communicating information and a processor 210 coupled to the bus 205 for processing information. The computing device 200 also includes main memory 215 such as a random access memory (RAM) or other dynamic storage device and a storage device 225 such as a solid state device, magnetic disk, or optical disk. In alternative embodiments, fewer, additional, and/or different types of memory or storage may be included in the computing device 200. The main memory 215 and the storage device 225 are coupled to the bus 205 for communication with and access by the processor 210. The main memory 215 and/or the storage device 225 can be configured to store information and/or computer-readable instructions that are to be executed by the processor 210. The computer-readable instructions can be used to implement any of the operations described herein with respect to the playback computing device 110, the communication computing device 130, the streaming computing device 140, and/or the studio computing device 150.

The computing device 200 may be coupled via the bus 205 to a display 235, such as a liquid crystal display, or active matrix display, for displaying information to a user. An input device 230, such as a keyboard including alphanumeric and other keys, may be coupled to the bus 205 for communicating information, and command selections to the processor 210. The input device 230 can include a cursor control, such as a mouse, a trackball, or cursor direction keys, for communicating direction information and command selections to the processor 210 and for controlling cursor movement on the display 235.

According to various embodiments, the processes of the playback computing device 110, the talkback device 120, the communication computing device 130, the streaming computing device 140, and/or the studio computing device 150 can be provided by the computing device 200 in response to the processor 210 executing an arrangement of instructions contained in the main memory 215. Such instructions can be read into the main memory 215 from another computer-readable medium, such as the storage device 225. Execution of the arrangement of instructions contained in the main memory 215 causes the computing device 200 to perform the illustrative processes described herein. One or more processors in a multi-processing arrangement may also be employed to execute the instructions contained in the main memory 215. In alternative embodiments, hard-wired circuitry may be used in place of or in combination with software instructions to implement illustrative embodiments. Thus, embodiments are not limited to any specific combination of hardware circuitry and software.

FIG. 3 is a flow diagram depicting operations performed in reviewing playback data in accordance with an illustrative embodiment. In an operation 310, the communication computing device 130 receives communication data from a remote device, such as the studio computing device 150. At least a portion of the communication data is provided to the at least one speaker of the communication computing device 130, in operation 320. In one embodiment, the communication data includes audio data and video data, and the audio data is provided to the at least one speaker.

In an operation 330, playback data that includes at least audio data and video data is received at the playback computing device 110. In an operation 340, the video data of the playback data is displayed on the display of the playback computing device 110, and the audio data of the playback data is output to the plurality of speakers of the playback computing device 110. In an operation 350, the microphone of the talkback device 120 is activated. The microphone is activated using the activating element, such as a button, switch, touchscreen, etc. Concurrent with activating the microphone, the plurality of speakers of the playback computing device 110 are muted. The at least one speaker of the communication computing device 110 may also be muted based upon the activating of the microphone. In an operation 370, audio is captured using the microphone. In an operation 380, the captured audio is transmitted from the communication computing device to a remote computing device, such as the studio computing device 150. The captured audio can include instructions on how the playback data should be modified or can include a confirmation that the playback data is acceptable. In an optional operation, the microphone is deactivated, which mutes the microphone and unmutes the plurality of speakers of the playback computing device 110. Deactivation of the microphone may also unmute the at least one speaker of the communication computing device 110.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable", to each other to achieve the desired functionality. Specific examples of "operably couplable" include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
   a communication computing device comprising:
      a chat module configured to transceive communication data to and from a studio computing device, wherein the communication data comprises video data and audio data, and wherein the communication data uses a first amount of bandwidth;
      a communication display configured to display the video data of the communication data;
      at least one communication speaker configured to convert to sound the audio data of the communication data; and
   a playback computing device comprising:
      a playback interface configured to receive playback data, wherein the playback data comprises video data and audio data, and wherein the playback data uses a second amount of bandwidth that is greater that the first amount of bandwidth;
      a playback display configured to display the video data of the playback data; and
      a plurality of playback speakers configured to convert to sound the audio data; and
   a talkback device operatively coupled to the communication computing device and the playback computing device comprising:
      a microphone configured to provide at least a portion of the communication data to the communication computing device; and
      an activating element configured, upon activation, to unmute the microphone and mute the plurality of playback speakers of the playback computing device.

2. The system of claim 1, wherein the communication computing device further comprises a camera configured to provide at least a portion of the communication data.

3. The system of claim 1, wherein the playback audio data comprises surround-sound audio.

4. The system of claim 1, wherein the audio data of the playback data is prioritized over the video data of the playback data.

5. The system of claim 4, wherein the audio data of the playback data is prioritized over the video data of the playback data using quality-of-service data.

6. The system of claim 1, wherein the playback interface of the playback computing device is further configured to send a confirmation upon completion of the output of the audio data and video data.

7. The system of claim 1, wherein the playback computing device does not send audio data or video data to a remote computing device.

8. The system of claim 1, further comprising:
   a streaming computing device comprising a communication interface configured to send the playback data to the playback computing device.

9. The system of claim 8, wherein the streaming computing device further comprises a security module configured to determine if the playback computing device is authorized to receive the playback data and send the playback data to the playback computing device only if the playback computing device is authorized to receive the playback data.

10. The system of claim 8, wherein the streaming computing device is configured to control the output of the video data and the audio data.

11. The system of claim 10, wherein the playback computing device is unable to control the output of the video data and the audio data.

12. A method comprising:
   receiving first communication data from a remote device at a communication computing device, wherein the communication data uses a first amount of bandwidth;
   providing at least a portion of the first communication data to at least one speaker of a first computing device;
   receiving playback data at a playback device, wherein the playback data comprises audio data and video data, and wherein the playback data uses a second amount of bandwidth that is greater than the first amount of bandwidth;
   displaying the video data of the playback data on a display of the playback computing device;
   providing the audio data of the playback data to a plurality of speakers of the playback computing device;

activating a microphone;

muting the plurality of speakers in response to the activation of the microphone;

capturing audio data using the microphone;

transmitting the captured audio data to the remote device from the first computing device.

13. The method of claim 12, wherein the video data is displayed on a second computing device, and wherein the audio data is provided on the second computing device.

14. The method of claim 12, further comprising:
capturing captured video data; and
transmitting the captured video data to the remote device.

15. The method of claim 12, wherein the audio data comprises surround-sound audio.

16. The method of claim 12, further comprising prioritizing the audio data over the video data.

17. The method of claim 16, wherein prioritizing the audio data over the video data comprises using quality-of-service data.

18. The method of claim 12, further comprising transmitting a confirmation that the audio data and video data have been fully outputted.

19. The method of claim 12, further comprising determining if the first computing device is authorized to receive the playback data, and transmitting the playback data to the first computing device only if the first computing device is authorized.

20. The method of claim 12, further comprising displaying at least a portion of the first communication data on a display of the first computing device.

* * * * *